March 2, 1943.  E. KOPF ET AL  2,312,420
HIGH PRESSURE CONTAINER
Filed Dec. 10, 1938
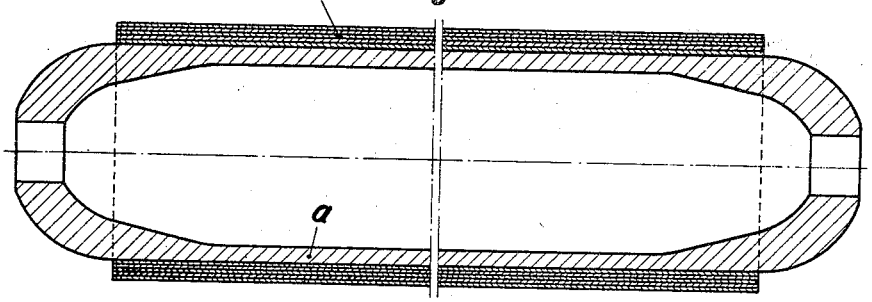
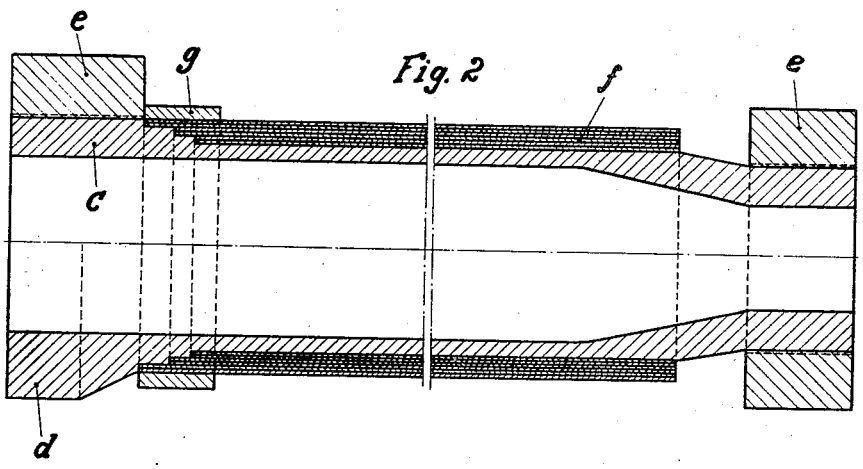
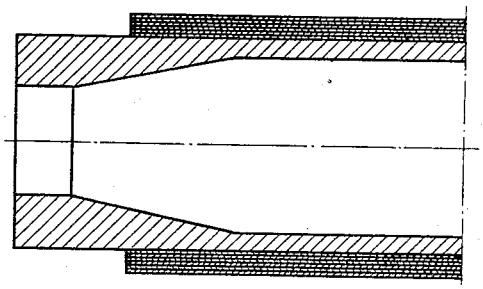
Inventor:
E. Kopf + R. Wasmuht
By: Glascock Downing & Seebold Patented Mar. 2, 1943

2,312,420

UNITED STATES PATENT OFFICE 2,312,420

HIGH PRESSURE CONTAINER

Emil Kopf and Roland Wasmuht, Dortmund, Germany; vested in the Alien Property Custodian Application December 10, 1938, Serial No. 245,048
In Germany December 14, 1937

2 Claims. (Cl. 220—3)

The present invention relates to containers for high internal pressures.

Containers which are subjected to high pressures and in the majority of cases also to high temperatures at the same time are at present forged from large steel blocks and for withstanding the stresses caused by the internal pressure they must often be made with thick walls. The demands placed on such vessels are continually becoming more exacting and have a natural limit in the weights of the rough block hitherto attainable and also in the dimensions of the forging presses available. The production of larger blocks is extremely difficult and it is even technically impossible to increase the dimensions of the blocks beyond a predetermined extent as the tendency to the formation of strong segregation zones increases with the increasing block weight and in the case of blocks of large cross-sections internal stresses cannot reliably be avoided during the solidification and cooling, so that the formation of cracks of smaller or larger size cannot be avoided with certainty. Consequently, it would be of the greatest importance if it were possible to produce high-pressure containers from smaller block units in some built-up form or other.

If it were proposed to produce high pressure vessels by rolling a plurality of plates one upon the other and welding the longitudinal joints, a thick-walled cylinder would be obtained composed of a plurality of separate plates or layers. In such instances it is always necessary to weld the ends of the container on the cylindrical tube section with a continuous weld. The presence of the numerous welds, but particularly of the tube section welded as a whole represents a great disadvantage for such containers because by the welding of thick and also non-homogeneous walls defects can easily occur, which in view of the pressure prevailing in the cylinders may lead to catastrophic results. For reasons of safety the tendency is therefore to forge such vessels from a solid block and not to produce them from welded material.

These disadvantages of the multiple-layer cylinder can be overcome according to the invention if the forged core is designed to withstand the longitudinal forces and the tangential stresses occurring at the same time are taken up by layers of sheet material additionally rolled on and welded in the longitudinal direction.

It is at the same time advisable to weld-on these sheet metal layers in such a manner that certain preliminary stresses are produced, so that pressure stresses are produced in the inner cylinder. This object can be attained for example by preheating the sheets before welding-on and by welding them together in the preheated state so that a shrinking effect takes place during the cooling.

By this method it is possible to produce large hollow bodies, which hitherto could only be made of the heaviest blocks, if at all. The high pressure chamber proper has in this instance no welds and can be machined internally and externally. It is possible by this invention to produce from blocks of the heaviest possible weight containers with considerably larger capacity and far higher pressures than was hitherto possible as the number of sheet metal layers may be increased as desired.

Several embodiments of the invention are illustrated by way of example in the accompanying drawing, in which:

Fig. 1 is a longitudinal section of a forged cylinder with several layers of sheet metal slipped thereon, Fig. 2 shows in a similar view an arrangement in which the transition from the cylinder to the thickened head end of the cylinder is step-shaped, Fig. 3 is a part longitudinal section of a head end of modified construction.

A Cylinder $a$ with domed ends forged according to a known process is covered with several layers of sheet metal plates $b$ (Fig. 1). These sheet metal plates are for example shrunk-on to produce preliminary pressure stresses in the forged cylinder wall. Therefore, the sheet metal plates are welded together in preheated condition. The weld are mutually displaced.

The form of construction illustrated in Fig. 2 shows a forged cylinder $c$ whose ends are either formed as flanges $d$ or have screw threads on to which a flange $e$ is to be screwed. The flange end of the cylinder $c$ has a stepped transition from the cylinder wall to the thickened head, so that each of the sheet metal plates $f$ fitted on the cylinder bears against a vertical edge and thus its edge is completely covered. By the stepped transition from the cylinder wall to the thickened head a favourable course of stresses is obtained in the transition portion. The outermost sheet metal plates are secured by a ring $g$ rolled, welded and shrunk thereover.

The head ends may be of various shape as shown in Figs. 1 2 and 3, but shapes other than those illustrated are possible.

We claim:

1. A high pressure container comprising a hollow cylindrical body of sufficient strength to withstand longitudinal forces developed within the body, thickened end portions integral with the hollow cylindrical body capable of withstanding longitudinal and transverse forces, stepped transition portions between the body and the end portions, a plurality of metal plates forming concentric cylinders fitted on said hollow body intermediate the adjacent stepped portions and tensioned circumferentially of the hollow body, said concentric cylinders increasing in length so as to successively bear against and overlie the stepped portions until they cover the stepped portions of greatest diameter so as to cooperate with the hollow cylindrical body and the stepped transition portions to withstand both longitudinal and transverse forces developed within the hollow body 2. A high pressure container as claimed in claim 1, in which rings surround the outer ends of the outermost sheet metal plates forming the concentric cylinders.

EMIL KOPF.
ROLAND WASMUHT.